US00RE34407E

United States Patent [19]

Frenzl

[11] E Patent Number: Re. 34,407

[45] Reissued Date of Patent: Oct. 12, 1993

[54] WATER SPORTS APPARATUS

[75] Inventor: Otto Frenzl, Innsbruck, Austria

[73] Assignee: Light Wave, Ltd., LaJolla, Calif.

[21] Appl. No.: 843,950

[22] Filed: Feb. 21, 1992

Related U.S. Patent Documents

Reissue of:

[64] Patent No.: 4,905,987
Issued: Mar. 6, 1990
Appl. No.: 265,318
Filed: Oct. 27, 1988

U.S. Applications:

[63] Continuation of Ser. No. 131,302, Dec. 7, 1987, abandoned, which is a continuation of Ser. No. 799,129, Nov. 18, 1985, abandoned.

[30] Foreign Application Priority Data

Nov. 22, 1984 [EP] European Pat. Off. ..... 84114072.6

[51] Int. Cl.[5] ..... A63G 3/00; A63G 31/16

[52] U.S. Cl. ..... 472/113; 472/128

[58] Field of Search ..... 272/17, 1 B, 56.55 SS, 272/26, 32; 137/563, 593, 571; 405/83, 79; 406/105, 106, 93, 85, 77; 290/42, 53

[56] References Cited

U.S. PATENT DOCUMENTS

| | | | |
|---|---|---|---|
| 490,484 | 1/1893 | Mackaye | 272/1 B |
| 1,536,875 | 5/1925 | Bowen . | |
| 1,884,075 | 10/1932 | Meyers | 132/563 X |
| 2,815,951 | 12/1957 | Baldanza | 272/17 X |
| 3,038,760 | 6/1962 | Crooke | 302/14 |
| 3,473,334 | 10/1969 | Dexter | 405/79 |
| 3,598,402 | 9/1971 | Frenzl | 272/17 |
| 3,853,067 | 12/1974 | Bacon . | |
| 3,913,332 | 10/1975 | Forsman | 405/79 |
| 4,564,190 | 1/1986 | Frenzl | 272/17 |

FOREIGN PATENT DOCUMENTS

| | | | |
|---|---|---|---|
| 0096216 | 2/1983 | European Pat. Off. . | |
| 159793 | 8/1903 | Fed. Rep. of Germany | 137/563 |
| 2222594 | 11/1973 | Fed. Rep. of Germany . | |
| 761489 | 3/1934 | France | 272/26 |
| 375684 | 6/1932 | United Kingdom | 272/26 |
| 935054 | 8/1962 | United Kingdom . | |
| 1090262 | 11/1967 | United Kingdom | 272/17 |
| 1118083 | 6/1968 | United Kingdom | 272/17 |
| 1159269 | 7/1969 | United Kingdom | 272/17 |

OTHER PUBLICATIONS

P. D. Killen, "Model Studies for a Wave Riding Facility" Aug. 18, 1980 Brisbane.

H. Hornung, "Surfing im Labor Strumungsmechanik des Wellenreitens", Feb. 1981, pp. 21-26.

*Primary Examiner*—Danton D. DeMille
*Attorney, Agent, or Firm*—Lorusso & Loud

[57] ABSTRACT

A water sports apparatus, for simultaneous practicing of a number of types of water sports, being a container having an inclined floor surface and closable lower supply nozzle. Water shooting upwardly over the floor surface flows over an overflow into a supplementary pool which is subdivided into two regions, between which regions is placed a grate, and preferably, on the downstream side of the grate, a backflow valve. On the end of the inclined floor near the supply nozzle is placed an elevated water container, the water from which enables starting of the supercritical torrential flow, until a water quantity necessary for circulation and having sufficient velocity is returned through a return line from the region of the supplementary pool farthest away from the overflow. The region of the supplementary pool near to the overflow enables the athlete to exit from the apparatus without influencing the supercritical torrential stream in the water container. The return line is preferably an open trough, which can flow along an arbitrary pathway through various regions of a recreational facility, and return to the elevated container, whereby in the trough, and pools communicating with it, varying flow conditions can be attained

12 Claims, 6 Drawing Sheets

WATER SPORTS APPARATUS

Matter enclosed in heavy brackets [ ] appears in the original patent but forms no part of this reissue specification; matter printed in italics indicates the additions made by reissue.

This is a continuation of co-pending application Ser. No. 131,302 filed on Dec. 7, 1987, which is a continuation of Ser. No. 799,129 filed Nov. 18, 1985, both now abandoned.

The invention relates to a water sports apparatus with a water container having an upwardly inclined floor surface, a closable supply nozzle along the lower edge of the floor surface, through which the water is conducted upward over the inclined floor surface at a supercritical stream velocity, and a return duct, which brings the water flowing over the upper edge of the floor surface back to the supply nozzle, the inlet of this duct being covered with a grate. The apparatus also has an elevated container placed above the supply nozzle to hold the quantity of water required for the starting process, and a circulation pump in the return duct.

BACKGROUND OF THE INVENTION

In U.S. Pat. No. 3,598,402 (FIG. 7), a water sports apparatus is described, which is suited in particular for practicing such water sports as surfing, water skiing, etc.

In this water sports apparatus, the water is forced upwards over an inclined floor with a supercritical flow rate (a so-called torrential flow) that is greater than the fundamental wave velocity, so that the weight component of the athlete directed obliquely downward on the ski or board, modifiable by shifting of the center of mass, is at least partially commpensated for by the flow resistance in the opposite direction. In this way, without support, continuous practice of water sports is possible. By preference, the water flows in a cycle from a lower supply nozzle obliquely upward over the inclined floor surface, and is conducted back to the supply nozzle through a return duct placed below the container. A significant characteristic of this arrangement is that the high kinetic energy of the water on exiting from the supply nozzle is for the most part converted into potential energy, which, by virtue of the return duct, can be recovered. Thus for moving water in the cycle, only a small input of energy to the circulation pump is required, since it is only necessary to cover the flow losses.

However, there still arise difficulties in the starting process, since, if it is desired to avoid interruption of the water cycle in the circulation pump installed in the return duct, it is possible to begin with backflow of the water only when there is a sufficient flow of water over the upper edge of the floor surface, to the inlet to the return duct. On the other hand, however, the acceleration to the necessary flow rate of the water present in the return duct by the circulation pump requires a certain time, which is not available, because the flow upward along the floor surface is interrupted before the necessary flow rate is achieved.

A further water sports apparatus incorporating this principle is described by EP-A-96 216. As disclosed therein, with unchanged energy supply, an increased inclination angle of the floor surface is achieved, principally by means of the fact that water quantities slowed at the floor surface by friction, which would cause premature breakdown of the flow, are suctioned of or accelerated by supplying water with a higher flow rate. In one embodiment of this apparatus (FIG. 8 in EP-A-96 216) there is an elevated container, which holds the quantity of water required for starting, at the side of the upper edge of the floor surface, whereby during starting the water passes from the elevated container through the return duct to the supply nozzle. Here, the circulation pump is actually placed in front of the opening of the supply nozzle, so that the difficulties of starting are reduced, however, hear again, several disadvantages arise, which complicate an attractive implementation in practice.

In familiar water sports devices, along the upper edge of the inclined floor surface, extends the grate covering the inlet to the return duct, which is required for safety reasons. This grate prevents fallen athletes and their equipment (surfboards, water skis, etc.) from being sucked into the return duct. It has been seen, however, that the exiting of fallen athletes in the area of the grate, and especially the removal of water sports equipment, is relatively difficult, so that generally external assistance is required. In addition, there is the danger that in the process, the water circulation will be so disturbed that the supercritical torrential flow on the rising floor surface will be interrupted. However, for restarting, it is necessary after closing the supply nozzle to return the water on the inclined floor surface to the elevated container.

A further disadvantage of water sports devices of this type is the fact that they are suitable exclusively for the type of sports described, and thus are to be erected independently of existing or newly-built swimming pools, for example in recreation centers.

The invention has undertaken the task of refining a water sports apparatus of the type cited, in such a way that not only trouble-free starting and operation are possible, but also the exiting of the athlete, especially after a fall, and the removal of sport equipment without difficulty. Furthermore, it is intended that a possibility be found to configure the water sports apparatus as an integral component of a large swimming pool system in a recreation center.

SUMMARY OF THE INVENTION

According to the invention, this is accomplished in that on the end of the inclined floor surface opposite from the elevated container, a supplementary pool is provided, the capacity of which is at least the fill volume of the elevated container, whereby the upper edge of the inclined floor surface forms an overflow into the supplementary pool, from which the return duct emanates.

The construction of a supplementary pool on the end of the rising floor surface opposite from the elevated container creates at this location of the water sports apparatus a sufficient water supply to start the circulation pump in the return line before, or at the latest immediately after, the opening of the supply nozzle, since water from this supply can be fed back until water exiting from the elevated container and the supply nozzle has reached the overflow, so that continuous water circulation is undisturbed. A special barrier can be supplied in the mouth of the return line in the elevated container, if for the start of flow, a portion of the water supply is first pumped into the elevated container, and only after reaching a certain water level, the supply nozzle is opened. Since, in order to achieve this purpose, a certain minimum water volume must be present in the supplementary pool, but no absolute upper boundary exists, the supplementary pool can be constructed in any desired size and form. This makes it possible, in order to facilitate a trouble-free exit from the water sports apparatus apart from the rising floor surface, to form the overflow with an underwater ridge, and in the first adjoining section of the supplementary pool to have a shallow water depth, and an initially slightly inclined floor, while the inlet to the return line is in a separate region of the supplementary pool, in which it is advantageous for the water depth to be greater.

In the first shallow region of the supplementary pool, in which the flow rate of the water is no longer to great, the water sports apparatus can be exited without disturbing the supercritical torrential flow along the rising floor surface, and without the athlete and equipment being drawn into the suction of the return line of the farther region of the pool. The catch grate is advantageously provided as a vertical terminator of this first shallow region.

At the start of flow of the water sports apparatus, in the first region of the supplementary pool, a starting wave is formed, which increases the water level in the supplementary pool. In the second region, in which it is desireable that, by lowering of the floor, a water depth suitable for swimming is present, this water depth can be maintained after stoppage of the circulation pump and emptying of the water remaining on the inclined floor surface, if downstream of the grate, a backflow valve is provided. This backflow valve can be made to pivot on a horizontal axis, so that it is opened by the water front arriving at the start of flow, remains open through the subsequent flow, and is closed again with closing of the supply nozzle and stopping of the circulation pump, whereby the higher water level in the region of the supplementary pool farther from the overflow is maintained. This water can be pumped over the inclined floor surface, in order to enable the next starting of the flow.

Because the supplementary pool has no upper limit to its capacity, from it an additional advantageous embodiment of the invention can be derived. It is possible to configure a large portion of the return duct as an open trough, which extends around the water container with the inclined floor surface in any desired pattern, and has its other end directly at the elevated container, in which it opens at the side opposite from the supply nozzle. There remains in this mouth section as short as possible a closed section of the return line, in which the circulation pump is installed. In the open trough, by means of changes in cross section and suitable ducts, various effects enhancing the appeal of the entrire installation can be brought about. For example, the flow rate can be increased by cross-section variations (familiar from DE-A-22 22 594), and whirlpool baths for children and adults, non-swimmer pools, etc., can be provided, so that the water sports apparatus according to the invention forms an integrated component of a large pool system. In addition, the serial construction of at least two water containers, with inclined floor surfaces is possible, with the region of the supplementary pool containing the inlet of the return line representing the second elevated container.

If the open trough is configured in a long linear form, or if a section of increased rate of flow is to be incorporated, in order to be able to keep the side walls low in this section, and to avoid a focalization of the starting wave, in a preferred form of embodiment, it is provided that the open trough is provided with a swimming channel, parallel to it, separated by a longitudinal dividing wall whereby the first section has a height over which the starting wave can spill. The excess of water engendered by the starting wave in this case flows over this longitudinal dividing wall, which by preference separates the swimming channel from the non-swimmer pool, following a shorter path to the elevated container.

BRIEF DESCRIPTION OF THE FIGURE OF THE DRAWING

In the following, the invention will be described in greater detail, by reference to the figures of the accompanying drawing, without being limited by these representations.

The drawing shows:

In FIGS. 1 to 3, a first schematic embodiment of the water sports apparatus, in longitudinal section, wherein FIG. 1 shows the apparatus at rest, FIG. 2, after starting of the circulation pump, and FIG. 3 at the start of the flow;

In FIG. 4, a top view of a preferred form of embodiment of a water sports apparatus as a component of a recreational facility;

In FIG. 5, a longitudinal section along the line V—V of FIG. 4;

In FIG. 6, the configuration in detail of the grate and the backflow valve, in vertical section;

In FIG. 7, the grate and backflow valve in horizontal section;

In FIG. 8, a schematic representation of two water sports installations in series, as a component of a recreational facility, analogous to FIG. 4.

DETAILED DESCRIPTION OF THE PREFERRED EMBODIMENT

Figure 1:
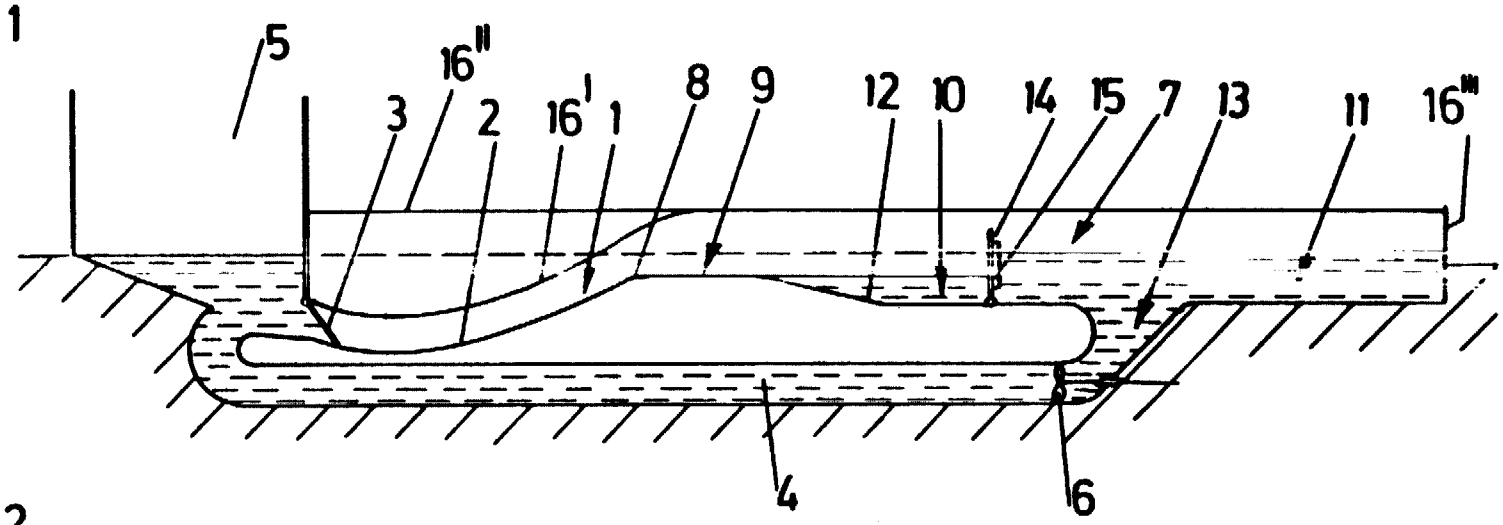
Figure 2:
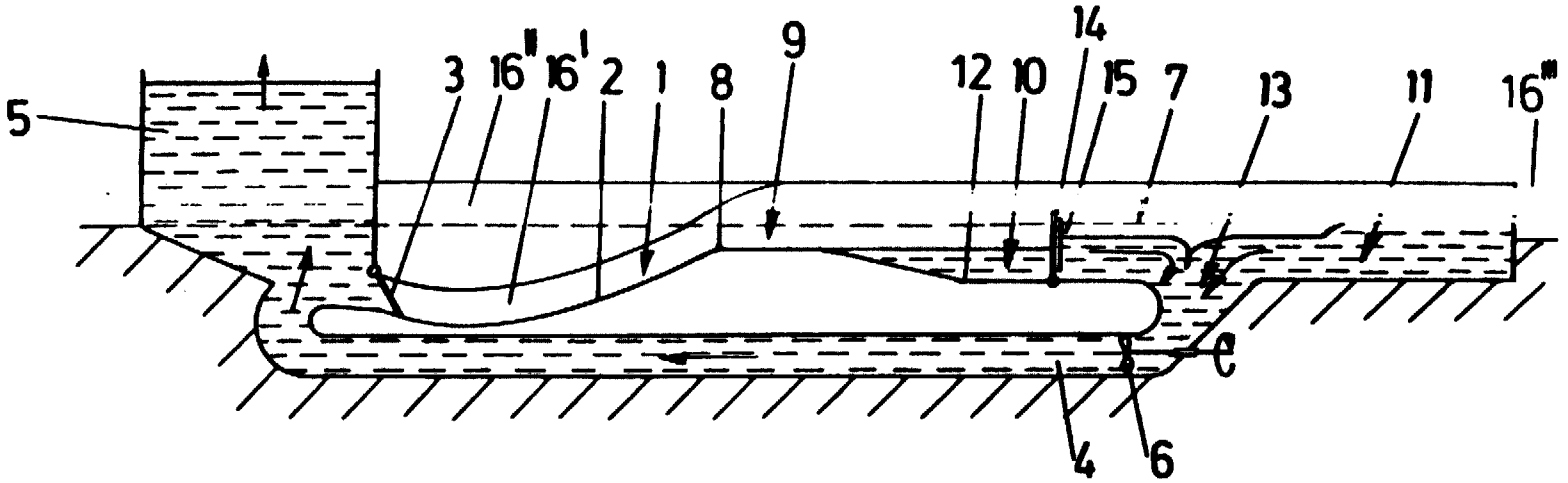
Figure 3:
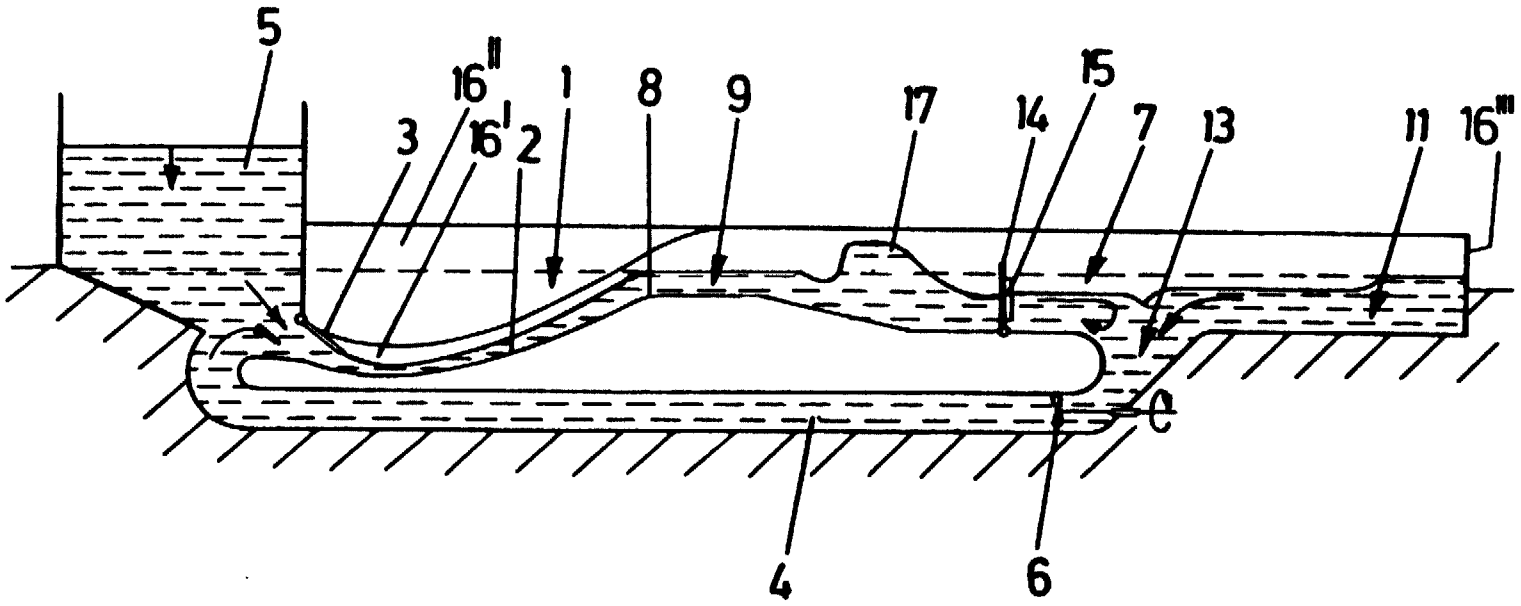

The water sports apparatus shown in FIGS. 1 to 3 in longitudinal section displays a water container 1, as shown in U.S. Pat. No. 3,598,402 cited at the outset. Adjacent an elevated container 5, with a lower outlet extending over the entire breadth, is the water container 1, which displays a floor surface 2 extending obliquely upward, in particular with a concave curvature. The outlet of the elevated container 5 forms the supply nozzle 3, which is positioned at the lower edge of the floor surface 2. The upper edge 8 of the floor surface 2 forms an overflow 9 into a supplementary pool 7, the capacity of which corresponds to at least the fill volume of the elevated container 5, but is preferably substantially greater. In a first region 10 of the supplementary pool 7, which region 10 connects the water container 1 directly at the overflow 9, the depth of the supplementary pool 7 is very low, whereby the floor surface 12 initially falls away slightly, and then extends horizontally. The termination of this first region 10 is formed by a vertically positioned grate 14, on the downstream side of which there is a backflow valve 15. The grate 14 separates the first region 10 from a second region 11 farther from the overflow 9, in which is positioned the inlet 13 to a return, line 4, which in this example of the invention is a closed tube passing below the water container 1, which tube opens from below into the outlet region of the elevated container 5. A circulation pump 6 is installed in the return line 4. The backflow valve 15, in the rest position as shown in FIG. 1, holds the water in the region 11 at a higher level than in the region 10, from which it could partially flow back through the overflow 9, by means of a pump mechanism not shown. At the longitudinal sides, the water container 1 is bounded by walls 16', which end at about sitting height above the water surface level of the supercritical torrential flow. Walls 16' enable a comfortable entry and exit from the water container 1. An outer side wall pair 16" bounds the water container 1 and the supplementary pool 7 at a height above the level of the starting wave 17 (FIG. 3), whereby on stopping of the apparatus before filling of the elevated container 5, the side walls 16' are overflowed at least at the deepest point, by the water above the floor surface 2. The supplementary pool 7 is naturally provided at the end with an end wall 16'''. Because the region 11 of the supplementary pool 7 and the elevated container 5 communicate through the return duct 4, the water level in the elevated container 5 corresponds to that in the region 11 of the supplementary pool 7, i.e. the elevated container 5 is filled to only a small fraction of capacity.

In order to start the water sports apparatus, which, to enable gliding sports such as surfing, water skiing, etc., requires a supercritical torrential stream upwards over the upwardly inclined floor surface 2, first the circulation pump 6 is activated, which sucks water from the region 11 of the supplementary pool 7, and fills the elevated container 5, as shown in FIG. 2. Initially, the supply nozzle 3 remains closed, until the necessary water level is reached in the elevated container 5. In the process, the region 11 of the supplementary pool contains a sufficient quantity of water so that water can be removed from region 11 without a great drop in water level in region 11 for at least long enough after supply nozzle 3 is opened. The water shooting upward over the floor surface 2 reaches the region 11 of the supplementary pool 7 before region 11 empties out, so that the water cycle flows continuously.

In FIG. 3, a situation is shown, in which the starting wave 17 forming from the initiation of flow has reached the first region 10 of the supplementary pool 7, from which water continues to be drawn from the region 11, without refilling, whereby the elevated container 5 is again partially emptied. The starting wave 17 propagating in the flow direction will subsequently reach the grate 14, and open the backflow valve 15, so that water can flow into the region 11, whereupon the water cycle can begin. As soon as this has occurred, the water container 1 can be utilized to carry out gliding water sports.

The athlete climbs in over a low side wall 16', upon which he first sits, and can leave the water container 1 over the opposite low side wall 16'. If the athlete falls, or is insufficiently skillful, he will be washed over the overflow 9 into the first region 10 of the supplementary pool 7, in which there is a substantially lower flow rate of water, with a lesser water depth. In this area, therefore, he can easily climb out of the water sports apparatus to the side, without disturbing the supercritical torrential flow in the water container 1, and recover his equipment, which will be caught at the grate 14. A practiced or prone surfer can also ride across the overflow 9, and climb out in the same way.

Figure 4:
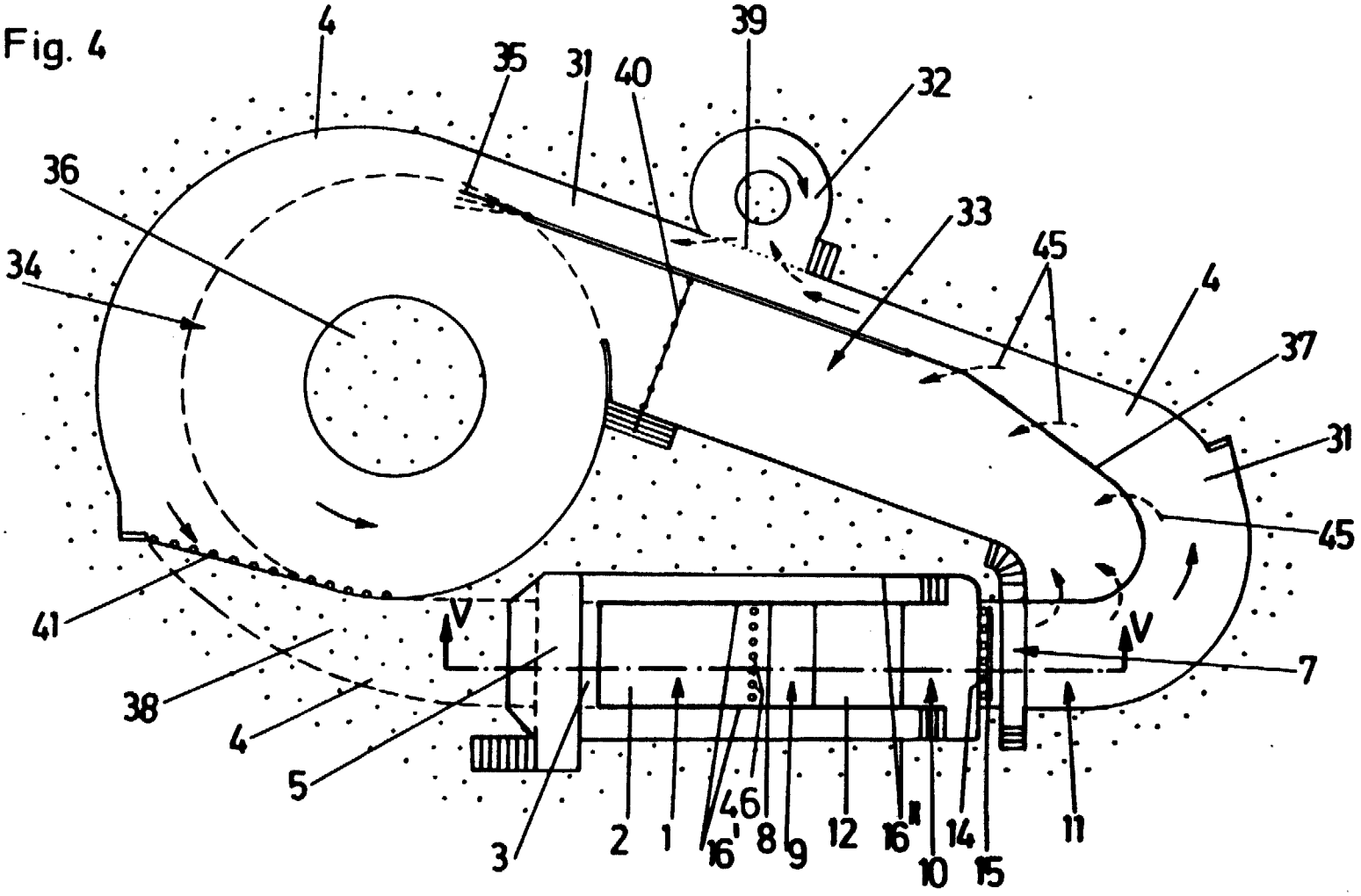
Figure 5:
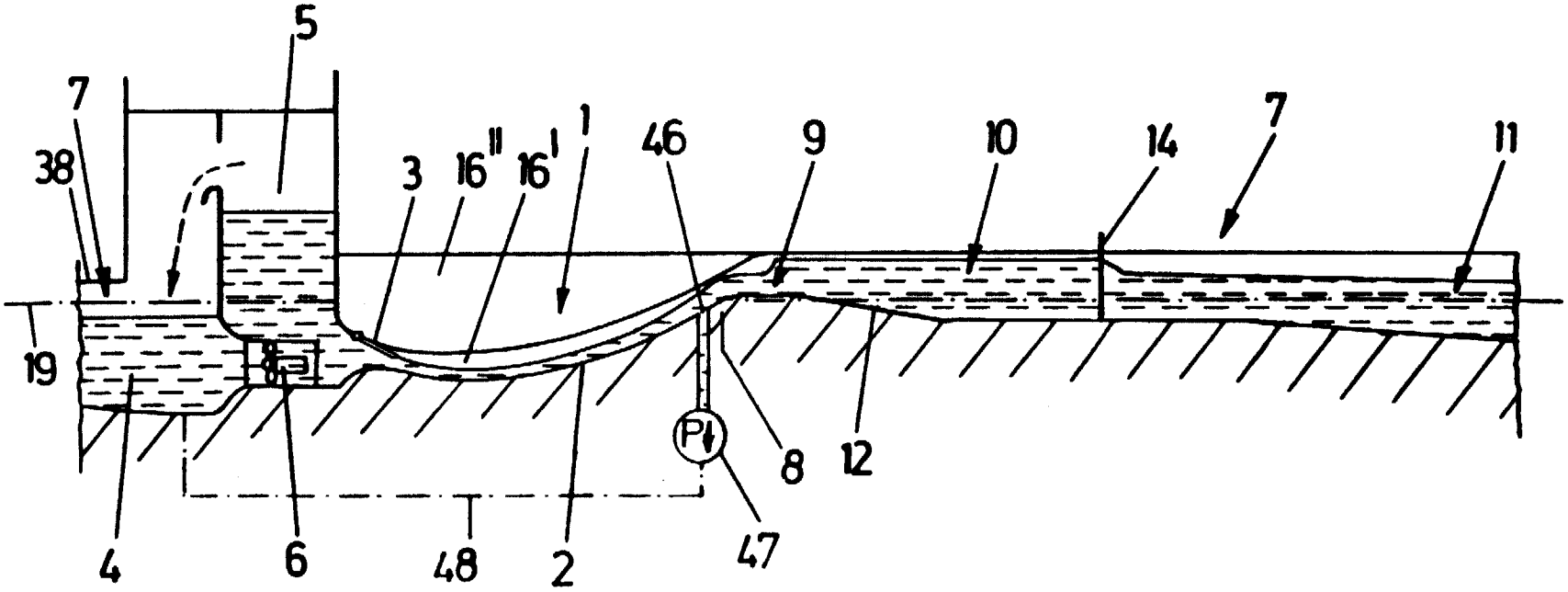

In FIG. 4 is shown a top view of a preferred form of embodiment of the invention. The water container 1 is here a component of a recreational facility with a swimming channel 31, a children's pool 32, a non-swimmer pool 33, and a whirlpool 34. As can be seen above all from FIG. 5, on the left side of the water container 1 in the drawing, is positioned the elevated container 5, whose outlet forms the supply nozzle 3 for the rising floor surface 2. In the region of the upper edge 8, inlet openings 46 are provided in the floor surface 2 through which a water boundary layer adjoining the floor surface 2 can be sucked off. The thickness of said water boundary layer increases with the increasing slope of the floor surface 2, said water boundary layer brakes the torrential flow because of the friction on the floor surface 2 and would cause the breakdown of said torrential flow, if an increased amount of energy were not supplied. The amount of energy can be kept lower if the thickness of the braked water boundary layer is kept low and the greater part of said layer is sucked off. The inlet openings 46 therefore comprise ducts 48 associated with a suction pump 47. The water which has been sucked off is then, in a different place, refed into the return line 4, as schematically shown in FIG. 5. The overflow 9 at the upper edge 8 of the rising floor surface 2 leads into the supplementary pool 7, which is subdivided by the grate 14 into a first region 10, adjacent to the overflow 9, for exiting of the athletes, and the farther region 11, from which the return duct emanates. This duct is configured as an open trough, and extends in an arbitrary path around the water container 1 to the elevated container 5 on the side opposite the inlet line 3. The water circulation between the supplementary pool 7 and the supply nozzle 3 through the open grate necessary for operation of the water sports apparatus is achieved in various ways.

Through variations of cross section in the swimming channel 31, differing flow rates arise, so that it is possible to swim with the current, across it, and in places against it. The same holds for the whirlpool 34, whose core 36 can be fluid or solid, whereby on entry into the whirlpool 34, a valve 35 is adjustable around a vertical axis, by which the water velocity in the whirlpool can be regulated. Between the non-swimmer pool 33 and the start of the swimming channel 31 there is a separating wall 37, which can be overflowed by the starting wave 17, so that the starting wave 17 is attenuated, and thus the starting process in the return channel is delayed. This leads to a temporary flow through the non-swimmer pool 33 (dashed arrow), which brings water on a short path to the pump 6. In this way, the connecting walls of the swimming channel 31 can be kept lower. The swimming channel 31 can thereby also be made very long, since in the starting process it receives less water.

The water in the children's pool 32 is driven by impulse exchange from the swimming channel, whereby a separation 39 is provided which hinders the energy exchange as little as possible. The non-swimmer pool 33 is separated from the whirlpool 34 by a cord 40 supported by a floating object. The end section of the open trough is covered by a movable cover 38, and separated from the whirlpool 34 by a grate 41. As can be seen from FIG. 5, in the transition between the end section of the return line and the elevated container 5, is placed the circulation pump 6, whereby the operation of the water sports apparatus proceeds as described above.

FIG. 4, the grate 14 in the supplementary pool 7 is again associated with the mentioned backflow valve 15, which prevents backflow of water from the open trough into the emptied water container 1. If the trough is long, and high in resistance, the water level 19 with the apparatus at rest (shown in FIG. 5 in dash-and-dot line) can lie below the floor in the overflow 9, so that the system can dispense with a backflow valve 15.

Figure 6:
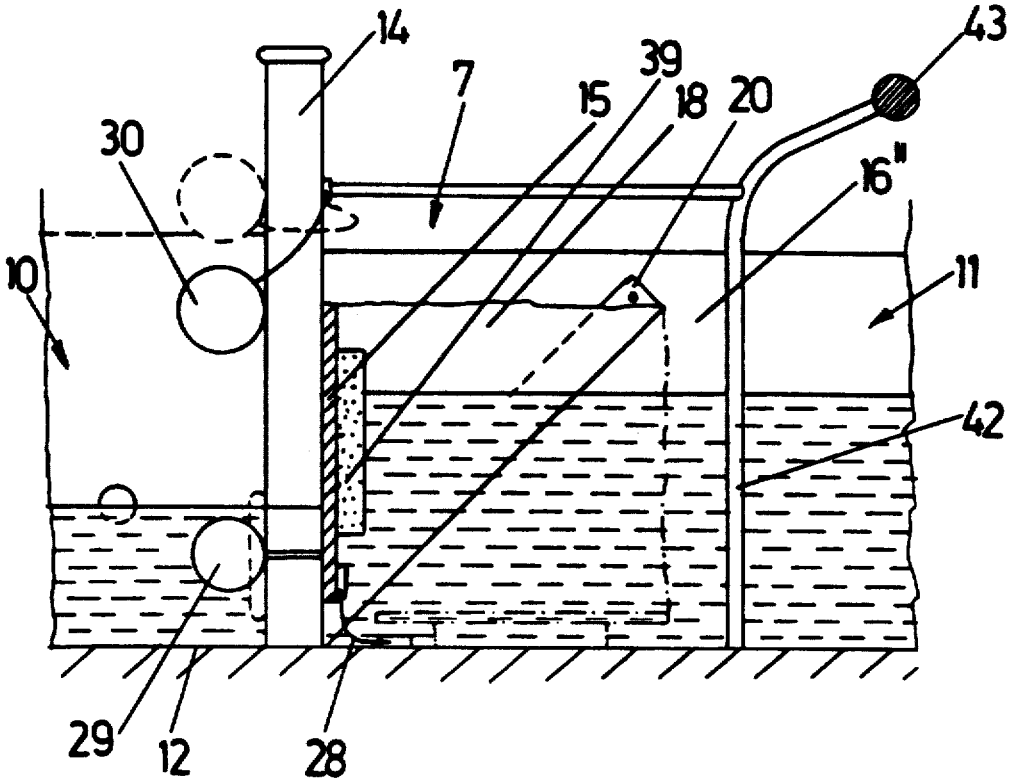
Figure 7:
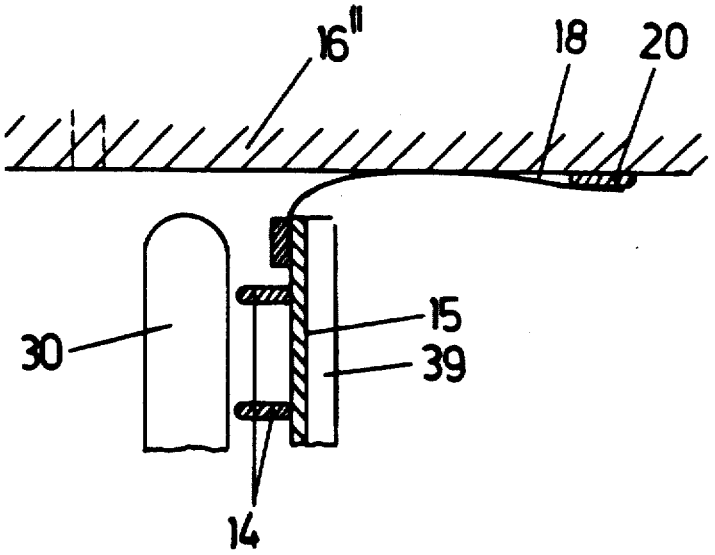

The grate 14 with a backflow valve 15 is represented in detail in FIGS. 6 and 7, whereby in the regions 10 and 11, the situation is shown approximately as represented in FIG. 2. The grate 14 consists of a number of vertical flat bars, onto which is loosely mounted a float 30 extending toward the floor, serving to protect sports equipment washed toward the grate. In the are of the grate near the floor 12, is placed a hose 29 or the like, whose cross sectional shape, as shown in dashed lines, is modifiable by a pressure medium. In this way, during operation of the apparatus, the resistance of the grate 14 can be varied continuously, whereby the position of the transition from super critical torrential flow to normal flow in the first region 10 of the supplementary pool 7 can also be modified.

The backflow valve 15 is connected to the floor through a water-tight hinge 28, and to seal 18 at the side wall 16'', with both the hinge 28 and the seal 18 consisting of flexible sheets. The lateral seal 18 is fixed by means of a ridge 20 attached obliquely on the side wall 16'', so that the backflow valve 15 swings downward into the position indicated by dash-and-dot line, at the start of the flow, and during the emptying of the water container 1 is forced upward by a driving body 39. The reference character 42 indicates an access barrier, consisting for example of individual vertical bars, to which is attached a crossbar 43, as a handle.

Figure 8:
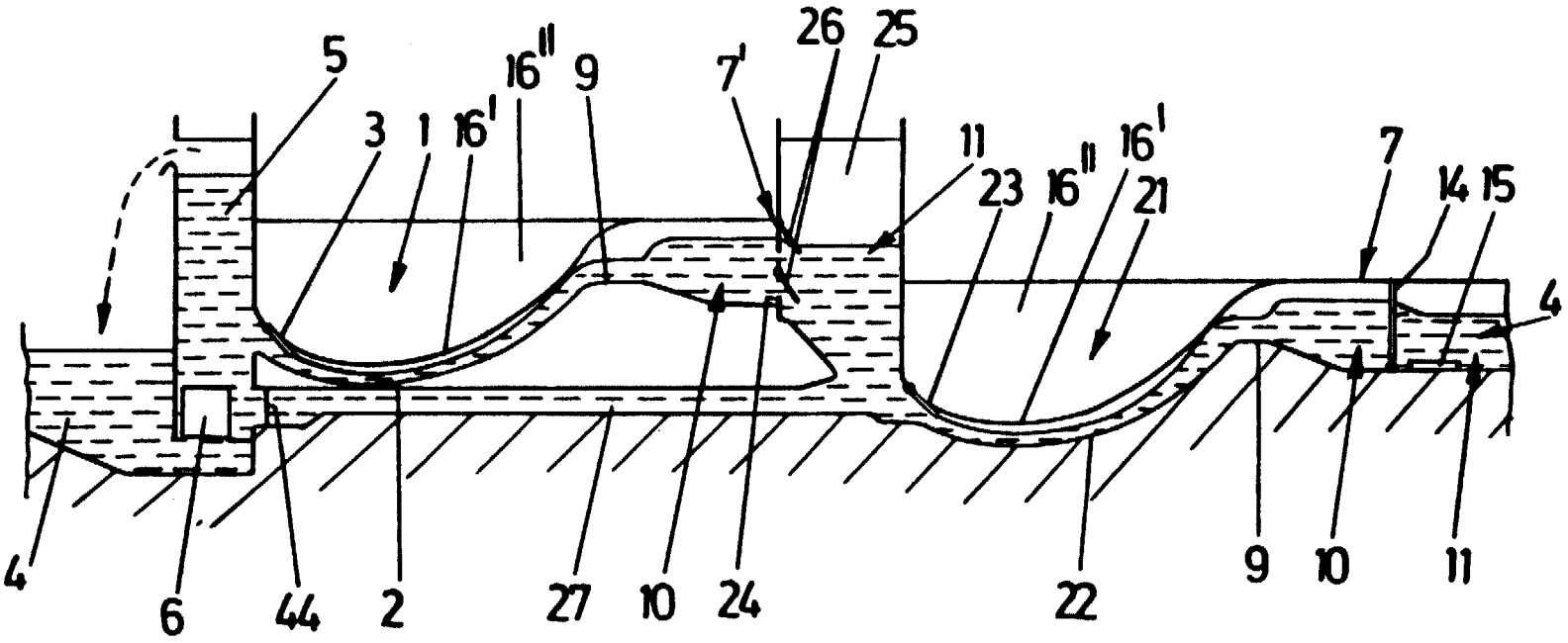

In the embodiment of the invention according to FIG. 8, in which the return line 4 (not shown) is again conducted through an open trough along an arbitrary pathway to the elevated container 5, two water containers 1, 21, suitable for water sports practice are arranged in series. The first supplementary pool 7' is subdivided by a grate 24 into two regions 10, 11. In the region 10 near the overflow, again it is possible to climb out. The region 11, farther from the overflow in this embodiment, is constituted by a second elevated container 25, which is connected to the second water container 21. This second container 21 also displays an inclined floor surface 22, over which water shoots upward from the supply nozzle 23, and reaches the second supplementary pool 7, which is again subdivided by a grate 14 with backflow valve 15, into the exiting region 10, and the region 11 farther from the overflow 9, from which the trough departs. Associated with the grate 24 of the first supplementary pool are backflow valves 26, which are opened at the start of the flow, and on emptying of the second water container 21, is closed again by means of the water pumped back into the second elevated container 25. The circulation pump 6 is positioned at the foot of the first elevated container 5. Between the two elevated containers 5, 25, there is a connecting duct 27 equipped with a valve 44.

As preparation of starting, with supply nozzles 3 and 23 closed, and water containers 1 and 21 emptied, both elevated containers 5 and 25 are filled to equal levels with water. Subsequently, the valve 44 is closed, and the supply nozzles 3 and 23 are opened in a time sequence such that upon arrival of the starting wave from the water container 1, the level in the elevated container 25 is already slightly below the level of the starting wave, whereby the backflow valves 26 open.

The water sports apparatus according to the invention enables problem-free installation of gearless submersible pumps 6, by preference mass produced pumps, and the simultaneous practicing of various types of water sports by a number of persons.

What is claimed is:

1. A water sports apparatus for conducting water through a course, said apparatus comprising:

(a) an elevated container, said elevated container of sufficient volume to receive a quantity of water for starting circulation of the water through the course;

(b) a water container adjacent said elevated container, said water container having an inclined floor surface leading form a lower edge to an upper edge and a closeable supply nozzle connecting the elevated container and the water container for directing water from the elevated container upward over the inclined floor surface in a super critical torrential flow, the upper edge of the inclined floor surface constituting an overflow;

(c) a supplementary pool adjacent said overflow, the volume of said supplementary pool being at least as great as the volume of the elevated container, said supplementary pool including a grate dividing the supplementary pool into two regions, a first region, said first region having a proximal end adjacent the overflow in the water container and a distal end, and a second region at the distal end of said first region; and (d) a return line comprising an open trough extending between said supplementary pool and said elevated container, said return line having an inlet positioned in said second region of the supplementary pool and a circulation pump to conduct water from the supplementary pool to the elevated container.

2. The water sports apparatus of claim 1 wherein said overflow comprises a ridged floor and said first region of the supplementary pool comprises a substantially planar floor surface adjacent the overflow leading to a downwardly inclined floor surface, wherein said first region has a lesser water depth than the second region prior to operation of the apparatus and wherein said first region and said second region may have substantially equal water depths during operation of the apparatus.

3. The water sports apparatus of claim 2, wherein said first region of said supplementary pool terminates at its downstream end in said grate.

4. The water sports apparatus of claim 3 further comprising a backflow valve downstream of said grate.

5. The water sports apparatus of claim 1 wherein said open trough comprises a swimming channel partitioned by a separating wall along the length of the swimming channel, said wall having a first section of a height over which a wave of water to start said circulation can flow.

6. The water sports apparatus of claim 1, said water container further comprising inner side walls adjacent the length of said first inclined floor surface, said inner side walls of a height such that they will be overflowed upon stopping circulation of the water sports apparatus, said water container further comprising outer side walls that are higher than said inner side walls and above the level of the wave to start said circulation.

*7. A water sports apparatus for conducting water through a course, said apparatus comprising:*

*a) elevated container, said elevated container of sufficient volume to receive a quantity of water for starting circulation of water through the course;*

*b) a water container adjacent said elevated container, said water container having an inclined floor surface*

*leading from a lower edge to an upper edge and a closable supply nozzle connecting the elevated container and the water container for directing water from the elevated container upward over the inclined floor surface in a super critical torrential flow, the upper edge of the inclined floor surface constituting an overflow;*

*c) a supplementary pool adjacent said overflow;*

*d) a return line comprising an open trough extending between said supplementary pool and said elevated container, said return line having an inlet positioned in said supplementary pool and a circulation pump to conduct water from the supplementary pool to the elevated container.*

*8. The water sports apparatus of claim 7, wherein said upper edge of said inclined floor surface further comprises duct means for maintaining a low water boundary layer by directing part of said water layer to said return line.*

*9. The water sports apparatus of claim 7, whereby said return line forms a continuous waterway with said supplementary pool, wherein said continuous waterway comprises a swimming channel.*

*10. A water sports apparatus for conducting water through a course, said apparatus comprising:*

*a) an elevated container, said elevated container of sufficient volume to receive a quantity of water for starting circulation of water through the course;*

*b) a water container adjacent said elevated container, said water container having an inclined floor surface leading from a lower edge to an upper edge and a closable supply nozzle connecting the elevated container and the water container for directing water from the elevated container upward over the inclined floor surface in a super critical torrential flow, the upper edge of the inclined floor surface constituting an overflow;*

*c) a supplementary pool adjacent said overflow comprising a first region, said first region having a proximal end adjacent the overflow in the water container and a distal end, and a second region at the distal end of said first region, said second region having an open trough means for providing a continuous waterway to said elevated container, whereby said open trough means comprises a swimming channel.*

*11. The water sports apparatus of claim 10, wherein said open trough means further comprises a circulation pump to conduct water to said elevated container.*

*12. A water sports apparatus for conducting water through a course, said apparatus comprising:*

*a) an elevated container, said elevated container of sufficient volume to receive a quantity of water for starting circulation of water through the course;*

*b) a water container adjacent said elevated contained, said water container having an inclined floor surface leading from a lower edge to an upper edge and a closable supply nozzle connecting the elevated container and the water container for directing water from the elevated container upward over the inclined floor surface in a supper critical torrential flow, the upper edge of the inclined floor surface constituting an overflow;*

*c) a supplementary pool adjacent said overflow comprising a first region, said first region having a proximal end adjacent the overflow in the water container and a distal end, and a second region at the distal end of said first region,*

*d) a return line comprising an open trough extending between said supplementary pool and said elevated container, said return line having an inlet positioned in said second region of said supplementary pool and a circulation pump to conduct water from the supplementary pool to the elevated container.*

* * * * *